United States Patent
Seyler et al.

(12)

(10) Patent No.: US 6,488,755 B1
(45) Date of Patent: Dec. 3, 2002

(54) ASPHALT COMPOSITIONS CONTAINING COATED CARBON FIBER, METHODS FOR THEIR MANUFACTURE AND USE

(75) Inventors: Paul E. Seyler, Ponca City, OK (US); Stephen D. Harris, Ponca City, OK (US); John Byron Sudbury, Ponca City, OK (US); Jeff D. Meyers, Billings, MT (US)

(73) Assignee: Conoco Inc., Houston, TX (US)

( * ) Notice: Subject to any disclaimer, the term of this patent is extended or adjusted under 35 U.S.C. 154(b) by 0 days.

(21) Appl. No.: 10/215,613

(22) Filed: Aug. 9, 2002

Related U.S. Application Data

(60) Provisional application No. 60/311,714, filed on Aug. 10, 2001.

(51) Int. Cl.[7] ........................... B32B 11/02; C08L 95/00; C09D 195/00

(52) U.S. Cl. ........................ 106/282; 106/272; 404/72; 428/367

(58) Field of Search ................................ 106/272, 282; 404/72; 428/367

(56) References Cited

U.S. PATENT DOCUMENTS 5,855,663 A * 1/1999 Takano et al. ............... 106/688

* cited by examiner

*Primary Examiner*—David Brunsman
(74) *Attorney, Agent, or Firm*—Fish & Richardson

(57) ABSTRACT

Asphalt compositions as well as asphalt paving compositions are improved by the inclusion of coated mesophase pitch carbon fibers having wax or waxy coatings to such compositions. Uses of such asphalt compositions, particularly with aggregates to form asphalt paving compositions are also disclosed.

5 Claims, No Drawings

ASPHALT COMPOSITIONS CONTAINING COATED CARBON FIBER, METHODS FOR THEIR MANUFACTURE AND USE

This application claims priority to co-pending provisional U.S. patent application Ser. No. 60/311,714, filed Aug. 10, 2001, entitled "Asphalt Compositions Containing Coated Carbon Fiber, Methods For Their Manufacture and Use".

The present invention generally relates to asphalt compositions are improved by the inclusion of carbon fibers, particularly short length carbon fibers produced from mesophase pitches.

BACKGROUND OF THE INVENTION

Asphalt cement, is a well known material which finds use in a number of applications, including in road surfaces, such as paved roadways as well as in the production of roofing products, particularly roofing shingles. Primary advantages of asphalt cements encouraging their use are its relatively low cost, and its waterproof characteristics. Asphalt cements are often derived obtained from the residue or bottoms from the petroleum refining industry and are primarily hydrocarbon based compositions. Typically, these residue and bottoms must be further refined or processed before they may be readily used. A common preparation process is oxidation of these residue or bottoms which advantageously raise the softening point and increase the stiffness of the asphalt cement. Modified asphalt compositions are also known, and include materials to which further additives have been added. Examples of such additives include natural or synthetic rubbers. Due to asphalt cements's poor tensile strength, inorganic or organic fibers are also know to be useful in improving the tensile strength characteristics of asphalt. For example, in roofing products mats of inorganic fibers (usually glass fibers) are used which mats are impregnated with asphalt. Other fillers, both of inorganic and organic materials are also known to be used in asphalt products. Exemplary fillers include carbon black, various fines, finely comminuted mine chatt, mine tailings, clinkers, cinders, ash, finely ground tires, clay, ground glass and beads of various inorganic or organic materials.

Asphalt cements are widely used in the formulation of paving compositions which typically contain asphalt cement, or modified asphalt cement which contains one or more performance improving additives, and an aggregate. Such are referred to as asphalt paving compositions, and are used around the globe. Notwithstanding the successful use of asphalt paving compositions in the production of roadways, certain inherent limitations in asphalt paving compositions lead to various forms of degradation which are undesired. One form of degradation, known as "rutting" relates to permanent defamation of asphalt paving compositions typically due to the passage of heavy traffic and/or frequent traffic over a stretch of roadway. Rutting is clearly visible as depressions formed at these forms at these point of contact, i.e., where tires or wheels contact the roadway. These are evident as valleys or grooves in the roadway, and the presence of such defects lead to various hazards due to the uneven payment. A second common defect in such paved roadways is thermal cracking. This type of defect is readily visible in form of horizontal cracks which extend perpendicular to the normal direction of vehicular traffic on the roadway. Such thermal cracking most commonly occurs which the roadway is subjected to very cold temperatures, i.e., typically during winter. These cracks are formed due to the thermal contraction of the paving compositions in a roadway. Such contraction imparts tensile stress within the roadway and within the paving compositions itself, and when such tensile stress exceeds the strength of the paved roadway, a crack or cracks will develop at the point of failure. A further common defect known to occur in paved roadways, typically manifests itself over a longer period of time. This defect, attributable to the age or fatiguing of the roadway, is generally visible as a serious of cracking in both horizontal and vertical directions. These cracks are typically are the result of fatigue suffered by the roadway, and particularly in the asphalt composition used to make the paved roadway. These cracks typically developed as the paving compositions ages, and the failure attributable to the many cycle of loading and unloading of the roadway which the roadway experiences during the course of normal vehicular traffic. In an attempt to counteract one or more of these technical problems known to the relevant art, various modifications to the paving compositions have been suggested. For example, the addition of organic polymers are known to the art, as well as the addition of certain fibrous materials. However, these have not always met with uniform success. Additionally, the use of these additives frequently is required in a relatively high loading before any benefits of their inclusion are realized in the asphalt paving compositions.

In the use of asphalt paving compositions, particularly reinforced asphalt paving compositions for use in the production of or repair of roadway surfaces, various paving compositions as well as the use of asphalt paving compositions in conjunction with reinforcing webs are known. Such well known reinforcement layers include glass fibers in mat form, other woven or nonwoven fibers, asphalt impregnated mats, mats of organic materials, such as polyester fibers, mats in the form of an open weave or grid, as well as plural layers of glass fibers or other reinforcement fibers. Typically, these reinforcement layers are applied to the roadway beneath or between subsequently applied asphalt paving composition layers and in such a configuration the reinforcement layer(s) operate to reinforce the asphalt paving compositions. Such reinforcement layers are often advantageously used in locations where the underlying pavement has cracked, and repairs to the roadway become have become necessary. Reinforcement layers are also know to be used over a complete roadway, such as during the original construction of a roadway, or during later repaving of a roadway.

Notwithstanding these uses and configurations of reinforcing materials with asphalt paving compositions, the process of assembling various layers making up a roadway remains a time consuming and costly process. Thus, there remains a real and continuing need in the art for improved asphalt paving compositions which can be used in the original construction of, or repaving of, or in the localized repair of a roadway, as well as methods for the manufacture of such improved asphalt paving compositions as well as their use in such construction, repaving or repair operations.

The present invention is directed to addressing these needs in the art.

In one aspect the present invention provides an improved asphalt paving compositions which can be used in the original construction of, or repaving of, or in the localized repair of a roadway.

In another aspect of the present invention there is provided a method for the manufacture of improved asphalt paving compositions which can be used in the original construction of, or repaving of, or in the localized repair of a roadway.

In a further aspect, the present invention provides a methods for the original construction of, or repaving of, or in the localized repair of a roadway utilizing an improved asphalt composition.

DETAILED DESCRIPTION OF THE INVENTION AND PREFERRED EMBODIMENTS

The present invention provides an improved asphalt paving compositions which can be used in the original construction of, or repaving of, or in the localized repair of a roadway.

According to the present invention, the present inventors have found that the inclusion of relatively short lengths of coated mesophase carbon fibers when included in an asphalt cement composition, and particularly when included in an asphalt paving compositions which includes an asphalt cement composition and which further includes an aggregate, provides a surprising improvement in many of the physical properties of the resultant asphalt paving compositions. These benefits and improvements have been observed even where the amount of the coated mesophase carbon fiber have been included in what would be considered generally minor amounts.

The asphalt paving compositions which are substantially improved by the inclusion of the mesophase carbon fibers are typically those which find present use the art. In regards to such compositions, typically these comprise a measurable portion of an aggregate, and a minor proportion of an asphalt cement or modified asphalt cement composition which is interspersed amongst coated mesophase carbon fibers. As is known in the art, typically the asphalt cement or modified asphalt cement is heated above its softening point and combined an (optionally heated) aggregate, wherein these are well-mixed and subsequently this mixture is applied to a surface. Such a surface may be a prepared grade upon which a new roadway is to be paved, and an existing roadway which is to be repaved, or indeed, the asphalt compositions according to the present invention containing the coated mesophase carbon fibers can be used in localized repair or patching of a roadway.

Useful as asphalt cement compositions are generally all of those which are presently known and used in the paving industry. Such asphalt cements include those that would contain a no non-asphalt additives, as well as those compositions which may include one or more additives which are intended to affect one or more of the physical properties of the asphalt cement. Such asphalt cements conventionally include bituminous substances generally, such as natural-asphalts or petroleum-refined asphalts, asphaltites, pyrogenous distillates, bottom stock, as well as other pyrogenous residues such as pyrogenous asphalts, petroleum pitch, coal tar pitch and mixtures thereof. Such material is often characterized by a penetration value of from 0–300 or higher (ASTM D-5-51), preferably about 40–300, with a softening point in the range of about 90°–250° F. (ASTM D-36-26), preferably between 100°–150° F. Useful sources of asphalt include many of those which are presently commercial available.

With regard to the aggregates which are typically combined with modified or non-modified asphalt cements, these too are understood to be widely variable and it is contemplated that any presently useful aggregate which may be combined with the modified or non-modified asphalt cements to also find use in the present invention. Typically, such aggregate used in the preparation of paving compositions are primarily inorganic materials, i.e., such as crushed rock, stone, and in certain instances, sand. Indeed, most hard, inorganic materials which can be comminuted to an appropriate size. The size of these aggregates depends in part upon the desired end use application of asphalt paving compositions. For example in laying down of a new or resurfaced roadway, larger aggregate is typically used as compared to crack repairing compositions which typically have a aggregate of lower average particle sizes. It is, of course, to be understood, that the aggregate, particularly when it is ground or crushed can be highly irregular. By way of non-limiting example widely used aggregates materials include: inorganic materials including sand, gravel, crushed stone and the like; certain organic materials including recycled tire materials and thermoplastics, as well as mixtures of one or more inorganic and organic materials. Other inorganic as well as organic materials known to be useful as aggregates, although not elucidated here, may also be used in the present inventive compositions.

A key technical consideration in the production of an asphalt paving composition is to insure the chemical compatibility of both the asphalt cement as well as the intended end-use application of the paving composition. With regard to chemical compatibility, factors such as the presence of undesired salts within the aggregate must be considered, in order to minimize that the likelihood of breakdown of either the asphalt paving compositions. Additionally, it is also a requirement that good adhesion of the aggregate and the asphalt cement contained in a paving composition exists to ensure that thorough "wetting" of the asphalt composition, and good mixing of these materials occurs, both prior to, and subsequent to the placement of the asphalt paving compositions on to a surface. Further, the physical characteristics of the aggregate must also be taken into consideration, i.e., under certain conditions where high levels of traffic, and/or heavy loads are expected to be encountered, and are a mixture appropriate to the expected usage patterns, can be selected. Compositions of the invention, in addition to the modified or unmodified asphalt cement composition, and the aggregate described above, is also useful wherein one or more further additives or modifiers are present. For example, the compositions according to present invention, may include inorganic fillers such as, for example, carbon black, clay, ground glass, beads, and other particular materials formed of various inorganic products. Such fillers typically have dimensions somewhat smaller than the aggregate within which they are used, and are frequently incorporated so to minimize the formation of a voidage in a paved concrete roadway. Is known that to the highly viscous nature, and the difficult handleability of a asphalt paving compositions during its preparation and application upon a surface, that the formation of internal voids which are a little more than air-spaces, occurs. Ideally, these eliminated, or at best, minimized. However, in a practice this proves to be difficult, if not impossible, to achieve and voidages of about 1% to about 8% by volume, typically about 4% by volume in the final paved roadway are commonly encountered. The use of fillers having small dimensions, is known to advantageously reduce the formation and/or the size of such voids in an asphalt paving composition. Further additives which can be present in conjunction with the asphalt and with the aggregate also include organic materials, such as for example, comminuted organic fillers, i.e., such as ground tires, or other hard organic residues or other hard organic materials which find use in such an application. Additionally, further chemical composition such as various polymers, polyolefings, rubbers, and elastomeric materials are also known to be useful as additives in asphalt paving compositions. These polymers typically modify one or more physical properties of the asphalt cements or asphalt paving compositions, and an example of useful additives include impact modifiers such Kraton® rubber (ex. Shell Corp.) which are well known in the art, and are available in a number of grades. These impact modifiers are also sometimes referred to as "core-shell" rubbers in that they generally comprise a more rigid outer core, containing within a more or less elastic shell. These materials which are typically available in particulate form, may be present in the pavement composition and, are known to advantageously improve the impact resistance of materials within which they are incorporated.

The asphalt paving compositions according to the present invention also may include fibrous materials other than the coated mesophase carbon fibers described hereinafter. These other fibrous materials may be produced from any material which is compatible in the asphalt compositions, however, frequently glass fibers in the form of fibers, tows, rovings, are known to be widely used in the art. Fiberglass, particularly has been known to be useful in asphalt containing compositions and may also be included with the coated mesophase carbon fibers described herein.

As has been noted, the key aspects of the present invention is the inclusion of coated mesophase pitch carbon fibers in short lengths which when included in asphalt cement compositions and particularly in asphalt paving compositions as it has been observed that they provide a significant improvement in one or more of the physical properties of the asphalt containing compositions even though said coated mesophase pitch carbon fibers are typically included in generally small amounts. With regard to the sources of such coated mesophase pitch carbon fibers, any coated mesophase pitch carbon fiber which can be provided in one or more of the forms described herein, can be used. Such materials are commercially available, or, for example, can be reproduced by known processes. By way of non-limiting example, processes for producing carbon fibers for mesophase pitch are, for example, known in U.S. Pat. Nos. 4,032,430, 3,974,264, 5,540,903, as well as U.S. Pat. No. 6,241,923 B1, the contents of all of the aforesaid being herein incorporated by reference in their entirety. A characterizing feature of mesophase pitch carbon fibers lies in the fact that a more ordered liquid crystal state exists in these carbon fibers as compared to conventional isotropic pitch fibers. The improved orientation of the liquid crystals within the mesophase pitch carbon fiber provide a more ordered structure and, while not be wishing to be bound by the following, it is believed that the improved characteristics of the asphalt compositions and asphalt paving compositions may be attributed to such an ordered structure within the mesophase pitch carbon fibers themselves. It is believed that the relatively high tensile strength of mesophase pitch carbon fibers, even when included in the asphalt compositions described herein, wherein they are provided primarily in short strands, still notwithstanding their short length, provide an advantageous improvement in at least tensile strength of the asphalt paving compositions within which they are not included. The inventors have also surprisingly observed that even relatively small amounts of the coated mesophase pitch carbon fibers, in short strands even when included in such minor amounts beneficially impact one or more of the physical properties of the asphalt compositions and asphalt paving compositions.

The mesophase pitch carbon fibers useful according to the present invention may be characterized in that they may have a length less than about 10 mm, when initially supplied for use in the compositions, but preferably have a starting length within the range of about 0.5 mm to about 9 mm, more preferably have a starting length in the range of about 3–7 mm. The diameter or cross-section of the mesophase pitch carbon fibers typically have dimensions of between about 7 microns to about 12 microns more preferably about 10 microns. Such mesophase pitch carbon fiber strands can be produced by any known process, and controlled milling, chopping, or any other process which results in mesophase pitch carbon fiber strands, or particularly with forms of mesophase pitch carbon fibers can be used in the practice of the present invention. These processes include those described in the patents identified above. Particularly useful forms of mesophase pitch carbon fibers includes those which are essentially chemically inert, i.e., to exhibit a higher or complete graphitization, as well as post-treated forms of mesophase carbon fibers which, subsequent to the formation, have surface modifications, i.e., such as ozonation, or other sizing process. Such surface modifications may come in certain instances, be desirable in order to improve the chemical and/or physical compatibility of the mesophase pitch carbon fibers, and one or more of the other constituents forming the asphalt paving compositions being taught herein.

As noted, prior to the use of, or prior to the addition of the mesophase pitch carbon fibers in the asphalt compositions described herein, and particularly the asphalt paving compositions described herein, these mesophase pitch carbon fibers are first provided with a wax, waxy or other chemical coating. The preferred coating is conveniently applied to the carbon fibers by contacting the short strands of the mesophase pitch carbon fiber with one or more aqueous soluble, emulsifiable or dispersible wax or waxy materials. The wax material useful can be selected from vegetable, animal, mineral, synthetic or petroleum waxes, for example, and optionally may be oxidized. Commercially available waxes include, by way of non-limiting example: Michem® Lube 296, (ex. Michelman, Inc., Cincinnati, Ohio) described to be a microcrystalline wax dispersion in an aqueous carrier, as well as Petrolite® 75 (ex. Petrolite Corp., Tulsa, Okla.) also described to be a microcrystalline wax dispersed in an aqueous base. Other paraffinic hydrocarbon dispersions in a fluid base, usually water, and frequently further containing one or more dispersing agents such as surfactants also find use in the present invention. A preferred waxy material useful as a coating composition for the mesophase pitch carbon fibers are polyalkylene emulsions including polyethylene and polypropylene emulsions, as well as polyoxyalkylene emulsions, many examples of which are commercially available. A preferred emulsion is Michem® Emulsion 39235 described to be a nonionic emulsion of a high density oxidized homopolymer, having about 35% solids, an average particle size of approximately 35 nm, and exhibiting a Brookfield viscosity of between about 10–50 cps, using a #2 spindle, at 60 RPM, at 23° C.

The mesophase pitch carbon fibers are coated by contacting them with the emulsions according to known techniques, for example, by immersing them in a bath containing the wax or waxy emulsions, or alternately the wax or waxy emulsions may be sprayed or rolled onto the mesophase pitch carbon fibers. These coated fibers may conveniently be passed through nips or nip rollers to facilitate a more thorough penetration of the wax or waxy emulsions into the fibers and/or to adjust the amount of treatment composition picked up by the fabric. Thereafter, the coated mesophase pitch carbon fibers is then dried.

Other known art techniques may be used, it being only required that subsequent to this treatment step that the mesophase pitch carbon fibers be provided with the chemical coatings, wax coatings or waxy material coatings on its surface.

While the coated mesophase pitch carbon fibers may be included in asphalt-containing compositions and still be considered within the scope of the inventive concepts toward herein, typically, these coated mesophase pitch carbon fibers are included in asphalt paving compositions which necessarily require asphalt, and at least one form of aggregate. As noted above, further optional additives may also be present, including fillers, further fibrous materials, further particular materials, as well as other inorganic or organic modifying additives. With regards to the minimum amounts of the mesophase pitch carbon fibers which are necessarily present, is understood that a minimum amount which provides a satisfactory improvement in one or more of the physical properties of that the asphalt paving compositions is sufficient to be considered within the scope of the present invention. Exemplary practical compositions of asphalt paving compositions, preferably fall within the following proportion of coated mesophase pitch carbon fiber: asphalt cement in respective parts by weight of 0.1–10:100, more preferably 0.1–7:100, still more preferably 0.2–5:100, and most preferably 0.25–1.5 parts by weight of coated mesophase pitch carbon fiber per 100 parts by weight of asphalt cement. In forming useful asphalt paving compositions, these proportions of asphalt cement and coated mesophase pitch carbon fibers are but two parts of a three component mixture, with a major proportion of an aggregate or blend of aggregates comprising the third component. The aggregate material described above, can vary but generally, is included in amounts equal to greater than the total amount of the coated mesophase pitch carbon fibers and asphalt cement described above. Generally, practically useful paving compositions include coated mesophase pitch carbon fiber and asphalt cement in one or more of the proportions described above, which asphalt containing compositions comprise on a proportional weight basis of asphalt cement and mesophase:aggregate of 1–8:92–99, but more preferably 2–6:94–96.

These three necessary constituents, as well as any further additives, may be applied to any manner which is effective in forming a useful distribution or dispersion of the coated mesophase pitch carbon fibers within the aggregate and asphalt. According to one technique, it is contemplated that the asphalt cement is first heated to about its softening point, and preferably to a point where it can be relatively readily mixed and thereafter the coated mesophase pitch carbon fibers are added in a suitable proportion and well-mixed into the softened asphalt cement. Any further optional additives can be introduced to the asphalt cement either prior to, or following the introduction of the coated mesophase pitch carbon fibers to the asphalt. Thereinafter, this premixture can be combined in any suitable manner with aggregate in a desirable proportion, and the resultant asphalt paving composition can be used in producing, resurfacing, or patching a surface. According to one technique, the aggregate would be added to the premix, and subsequently could be applied to a surface period. Accordingly to a more preferred embodiment, however, in utilizing conventional machinery known for paving or repairing road surfaces, a heated premixture as described above is sprayed or mixed with an appropriate proportion of aggregate just prior to its deposition upon a surface. Such technique is known, and may be used utilizing the present inventive compositions. However, other techniques although not particularly elucidated may also be utilized.

Preferred methods for combining the asphalt cement, optionally with the aggregate, and the coated mesophase pitch carbon fibers are those methods which have low-shear mixing conditions. While it is understood that high-sheer mixture is typically useful in ensuring a homogeneous distribution of a particulate, i.e., such as the coated mesophase pitch carbon fibers strands within a matrix such as softened asphalt cement, it is preferred that a low-mixing technique be utilized. It has been observed by the inventors that low-shear mixing conditions are preferred in ensuring that the coated mesophase pitch carbon fiber strands are not unduly degraded during the mixing process.

While not wishing to be bound by the following, it is believed that the coated coated mesophase pitch carbon fibers are not unduly degraded during the mixing process as it is believe that the upon contact with the heated asphalt cement and with the aggregate, the chemical coating, especially a wax or waxy coating acts both as a lubricant to ensure that the mesophase pitch carbon fiber strands are not unduly degraded or mechanically broken to a great extent during this mixing process, and also, the wax or waxy coating does not overly quickly degrade or dissolve into the asphalt, particularly wherein the wax or waxy coating has a glass transition temperature (Tg) which is at least as high as the temperature of the heated asphalt cement, or the asphalt cement and aggregate mixture. In many circumstances this Tg is at least 10° C.–50° C. higher than the temperature of the heated asphalt cement, or the asphalt cement and aggregate mixture, although in different circumstances it is foreseeable that this Tg is equal to, or less than the temperature of the heated asphalt cement, or the asphalt cement and aggregate mixture. In such latter circumstances, it may be desired that the chemical, or wax or waxy coating first be present in an amount sufficient to protect or lubricate the strands of mesophase pitch carbon fibers, and thereafter melt into the asphalt cement portion of the asphalt paving composition. From the foregoing then, it will be appreciated that the selection of a wax or waxy coating material, provided via an emulsion to strands of mesophase pitch carbon fibers, may be at least partially determined by the desired performance of the wax or waxy coating, its glass transition temperature and the physical, including temperature conditions foreseen in the production or application of the asphalt containing compositions.

The present invention also provides a method for the manufacture of an improved asphalt paving compositions which can be used in the original construction of, or repaving of, or in the localized repair of a roadway. Such improved asphalt paving compositions include an effective amount of the coated mesophase pitch carbon fibers described herein which are present in amounts which are sufficient to improve one or more of the structural characteristics of the roadway.

The improved asphalt paving compositions described herein find use in the original construction of a roadway, or in the repaving of a roadway, as well as in the localized repair of a roadway.

The coated mesophase pitch carbon fibers containing asphalt compositions according to the invention find a wide variety of uses, but are particularly advantageous when used in construction, maintenance, or repair of roadways and other paved surfaces. The inventive compositions may be applied in any manner currently known in the art useful in providing roadways or other paved surfaces. For example, compositions can be easily applied using conventional grating and asphalt-laying machines. Such as are currently encountered in the construction of new roadways, as well as in the resurfacing of pre-existing roadways. Further, other paved surfaces, other than roadways such as, for example, paths, walkways, bicycle pathways, and the like, may also benefit from the improved characteristics of the present inventive compositions. In such alternate roadways, appropriate machinery for the laying down of such paved surfaces, as well in the resurfacing of such other paved surfaces, although of course, the compositions according to the invention, can also be manually applied as well as manually compacted upon a surface.

The inventive compositions also find particular use in the localized repair of a roadway. As the inventive compositions exhibit improve physical properties, particularly with respect to cracking such as thermal cracking, or fatigue cracking. As such, the inventive compositions find good use as repair materials in already existing roadways or other paved surfaces. The inventive compositions can be used as patching materials, or as well can be used as crack fillers or sealants.

The present inventive compositions typically provide improved product performance as compared to other fiber containing asphalt compositions as well as other fiber containing pavement compositions or fibers other than the coated mesophase pitch carbon fibers are utilized. Thus, according to certain preferred embodiments, there are provided asphalt compositions as well as asphalt paving compositions which comprise as their sole fibrous component, a coated mesophase pitch carbon fiber. An alternative, albeit, also preferred embodiment, there are provided asphalt containing compositions, and particularly asphalt paving compositions which include at least two fibrous materials, the first being coated mesophase pitch carbon fibers, and a second fiber made of another material which also may also optionally be coated with a chemical coating, or a wax or waxy material.

In certain instances, asphalt containing compositions containing as a sole fibrous component, the coated mesophase pitch carbon fibers can be preferred due to the fact that the excellent result in characteristics observable due the inclusion of the coated mesophase pitch carbon fibers may in certain circumstances, dictate that it be the sole fibrous material present. Such, for example, may be were a simple composition, i.e., that within relatively fewer number of necessary components is desired. Also, due to the excellent performance characteristics of the coated mesophase pitch carbon fibers, a relatively low-loading is necessary in order to achieve comparable, or in fact, improved performed characteristics compared to other non-mesophase carbon fibers, often even at relatively higher-loading levels. Yet, it is also realized that under other circumstances, it may be desired to include two different types of fibrous materials to an asphalt composition, and especially an asphalt paving composition. For example, the addition of even a minor amount of coated mesophase pitch carbon fibers can improve the performance characteristics of a fiber-containing asphalt composition or fiber-containing asphalt paving composition. In such a latter set of circumstances, the coated mesophase pitch carbon fibers could be considered a further additive material.

The present invention will be more readily understood following the examples which include certain preferred embodiments.

EXAMPLES

Example 1

An asphalt paving composition is produced as follows.

A mat of mesophase pitch carbon fibers having an average diameter of about 7 microns to about 12 microns was fed through a pan containing an aqueous bath which formed of water and Michem® Emulsion 39235 wherein the solids content of the bath was 10% solids. The mat of mesophase pitch carbon fibers was saturated, and takeup was approximately 8%. Thereafter, the mat was dried by placing it into an oven at 275° F., for 8–12 hours in order to drive off coated mesophase pitch carbon fibers. Thereafter the coated mesophase pitch carbon fibers were chopped to an average fiber strand length of about 2–3 mm.

These chopped coated mesophase pitch carbon fiber strands are combined with the following constituents to form an asphalt paving composition:

| Constituent | % wt. |
|---|---|
| Aggregate (23% wt. of ¾ inch chips, 40% wt. mine chat, 27% wt. screenings 10% wt. sand) | 94.975% |
| Asphalt cement | 5% |
| Coated mesophase pitch carbon fiber strands | 0.025% |

The asphalt cement is first heated above its softening point and afterwards the coated mesophase pitch carbon fiber strands is mixed in and homogenously dispsersed in the asphalt cement to form a premixture. Thereafter this premixture is combined with the aggregate and used to pave a surface to form a roadway.

Example 2

The composition according to Example 1 is used to repair an existing roadway surface by filling in a defect.

Example 3

A crack filling composition is produced by combining between 95–99.9 parts by weight of a softened asphalt cement, with 5–0.1 parts by weight of the coated mesophase pitch carbon fiber strands produced as described in Example 1. This crack filling composition is used to repair a narrow crack in a paved roadway or in a concrete surface, such as a concrete roadway or concrete sidewalk.

Example 4

An asphalt paving composition was produced as follows.

A mat of mesophase pitch carbon fibers having an average diameter of about 7 microns to about 12 microns was fed through a pan containing an aqueous bath which formed of water and Michem® Emulsion 39235 wherein the solids content of the bath was 10% solids. The mat of mesophase pitch carbon fibers was saturated, and takeup was approximately 8%. Thereafter, the mat was dried by placing it into an oven at 275° F., for 8–12 hours in order to drive off coated mesophase pitch carbon fibers. Thereafter the coated mesophase pitch carbon fibers were chopped to an average fiber strand length of about 2–3 mm.

These chopped coated mesophase pitch carbon fiber strands were combined with the following constituents to form an asphalt paving composition:

| Constituent | % wt. |
| --- | --- |
| Aggregate (25 parts of 8–11 mm crushed gravel/rock/stone<br>12 parts of 4–8 mm gravel/rock/stone<br>8 parts of 2–4 mm gravel/rock/stone<br>30 parts of 0.8 mm of natural gravel<br>23.975 parts of 0.2 mm of stone powder) | 93% |
| Ground chalk filler | 1% |
| Asphalt cement | 6% |
| Coated mesophase pitch carbon fiber strands | 0.025% |

The asphalt cement was first heated above its softening point and afterwards the coated mesophase pitch carbon fiber strands were mixed in and homogenously dispsersed in the asphalt cement to form a premixture. Thereafter this premixture was combined with the aggregate and used to pave a surface to form a roadway at a loading of approx. 100 kilograms of this asphalt paving composition per square meter, and a thickness of 4 cm.

As is understood from the reading of this specification the present invention provides new materials, methods for their production and methods for their use in providing, improving or repairing surfaces, particularly roadways. Prior to the present invention, the materials, methods for the use and products produced utilizing them were not known, nor were apparent from the prior art.

While the invention is susceptible of various modifications and alternative forms, it is to be understood that specific embodiments thereof have been shown by way of example but which are not intended to limit the invention to the particular forms disclosed; on the contrary the intention is to cover all modifications, equivalents and alternatives falling within the scope and spirit of the invention as expressed in the appended claims.

What is claimed is:

1. An improved asphalt composition comprising:

asphalt cement;

coated mesophase pitch carbon fibers.

2. An improved asphalt composition according to claim 1 wherein the asphalt composition comprises mesophase pitch carbon fibers having lengths of less than about 10 mm, and which comprise a wax or waxy coating upon said fibers.

3. An asphalt paving composition which comprises:

asphalt cement;

coated mesophase pitch carbon fibers; and, aggregate.

4. A method for providing a paved roadway which comprises the steps of:

laying an asphalt paving composition which comprises asphalt cement, coated mesophase pitch carbon fibers, and aggregate on a surface.

5. A method for repairing a paved surface which comprises the steps of:

providing an asphalt composition which comprises asphalt cement, and coated mesophase pitch carbon fibers to a defect in a paved surface.

* * * * *